(12) United States Patent
Matsubara et al.

(10) Patent No.: US 6,797,434 B1
(45) Date of Patent: Sep. 28, 2004

(54) NEGATIVE ACTIVE MATERIAL FOR RECHARGEABLE LITHIUM BATTERY, ELECTRODE FOR RECHARGEABLE LITHIUM BATTERY, RECHARGEABLE LITHIUM BATTERY AND METHOD OF PREPARING NEGATIVE ACTIVE MATERIAL FOR RECHARGEABLE LITHIUM SECONDARY BATTERY

(75) Inventors: Keiko Matsubara, Yokohama (JP); Toshiaki Tsuno, Yokohama (JP); Sang-Young Yoon, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 09/672,287

(22) Filed: Sep. 28, 2000

(30) Foreign Application Priority Data

Sep. 28, 1999 (JP) ............................................. 11-275381

(51) Int. Cl.[7] .............................................. H01M 4/58
(52) U.S. Cl. .............................. 429/231.95; 429/218.1; 429/231.1
(58) Field of Search .......................... 429/218.1, 231.1, 429/231.95, 231.8

(56) References Cited

U.S. PATENT DOCUMENTS 5,591,547 A * 1/1997 Yoneda et al. .............. 29/623.5
6,004,695 A * 12/1999 Goda et al. ............... 429/218.1

FOREIGN PATENT DOCUMENTS

| JP | 10-21913 | | 1/1989 | |
| JP | 7-192723 | | 7/1995 | |
| JP | 10-21913 | * | 1/1998 | ............ H01M/4/58 |

* cited by examiner

Primary Examiner—Dah-Wei Yuan
(74) Attorney, Agent, or Firm—Christie, Parker & Hale, LLP (57) ABSTRACT

Disclosed is a negative active material for a rechargeable lithium battery exhibiting a high charge and discharge capacity, high charge and discharge efficiency, good discharge curve flatness, good charge and discharge cycle characteristics and high packing density.

The negative active material includes a product made by agglomerating particles of a mixture of a carbonaceous material and an amorphous metal compound. The carbonaceous material is a material into or from which lithium is intercalated or deintercalated, and the amorphous metal compound is able to make an alloy with lithium.

8 Claims, 7 Drawing Sheets

NEGATIVE ACTIVE MATERIAL FOR RECHARGEABLE LITHIUM BATTERY, ELECTRODE FOR RECHARGEABLE LITHIUM BATTERY, RECHARGEABLE LITHIUM BATTERY AND METHOD OF PREPARING NEGATIVE ACTIVE MATERIAL FOR RECHARGEABLE LITHIUM SECONDARY BATTERY

CROSS REFERENCE TO RELATED APPLICATION

This application is based on application No. Hei 11-275381 filed in the Japanese Industrial Property Office on Sep. 28, 2000, the content of which is incorporated hereinto by reference.

BACKGROUND OF THE INVENTION (a) Field of the Invention

The present invention relates to a negative active material for a rechargeable lithium battery, an electrode for a rechargeable lithium battery, a rechargeable lithium battery and a method of preparing the negative active material for a rechargeable lithium battery and, more particularly, to a negative active material for a rechargeable lithium battery including a particle-agglomerated product.

(b) Description of the Related Art

The development of miniaturized, light and high performance electronics has provoked the need for a rechargeable battery having a high capacity.

It has been known that graphite with a theoretical capacity of 372 mAh/g exhibits a higher capacity than other negative active materials. In order to increase the capacity of rechargeable lithium batteries, studies on a new negative active material with a higher capacity than graphite have been undertaken. The studies have been done to develop either a new material which is different from graphite, or a mixed material including a graphite core.

Tin compounds have conventionally been considered as negative active materials to replace graphite. It is known that tin in the tin compounds makes an alloy with lithium that exhibits a higher discharge capacity than graphite.

The tin compounds, however, have lower initial charge and discharge efficiency, bad discharge curve flatness and inferior charge and discharge cycle characteristics, when compared with graphite. These drawbacks make it difficult to use tin compounds for negative active material in a rechargeable lithium battery, but attempts to use tin compounds have continued because in they have the unneglectable advantages of greater charge and discharge capacity over graphite. It is expected that a fantastic negative active material may be obtained when tin compounds are mixed with graphite.

Recently, a negative active material with a mix of graphite and tin compound has been suggested. The negative active material can be densely coated on an electrode because graphite has a flake configuration, but the resulting electrode exhibits low wettability to electrolyte and thus the charge and discharge reaction cannot be readily produced because of graphite.

SUMMARY OF THE INVENTION

It is an object of the present invention to provide a negative active material for a rechargeable lithium battery having high charge and discharging capacity, high charge and discharge efficiency, good discharge curve flatness, good charge and discharge cycle characteristics and high packing density.

It is another object to provide a method of preparing the negative active material for a rechargeable lithium battery.

It is still another object to provide an electrode using the negative active material.

It is still another object to provide a rechargeable lithium battery using the negative active material.

These and other objects may be achieved by a negative active material for a rechargeable lithium battery including a particle-agglomerated product. The particle-agglomerated product includes a carbonaceous material into or from which lithium is intercalated or deintercalated, and an amorphous metal compound that is able to become an alloy with lithium.

The present invention provides a negative electrode for a rechargeable lithium battery including the negative active material and a rechargeable lithium battery including the negative active material.

The present invention also provides a method of preparing a negative active material for a rechargeable lithium battery. In this method, a fatty acid metal salt is added and agglomerated with a carbonaceous material to produce an agglomerated precursor, and the agglomerated precursor is then heat-treated to convert the fatty acid metal salt into the amorphous metal compound and to produce a particle-agglomerated product.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying, wherein.

DETAILED DESCRIPTION OF THE INVENTION

The present invention provides a negative active material including a particle-agglomerated product. The particle-agglomerated product includes a carbonaceous material into or from which lithium is intercalated or deintercalated, and an amorphous metal compound which is able to make an alloy with lithium.

It is preferable that the amorphous metal compound is partly coated on the particle-agglomerated product.

In addition, it is preferable that the amorphous metal compound is included in the particle-agglomerated product.

The particle-agglomerated product preferably has an average diameter of 6 to 40 μm.

It is desirable that the particle-agglomerated product includes a binder.

The negative active material for a rechargeable lithium battery of the present invention includes a metal which is able to make an alloy with lithium. The metal is one or more than two metals selected from Sn, Ag, Fe, Pd, Pb, Al, Si, In, Ni, Cu, Co, Zn or Cd.

The exemplary of the metal compounds may be SnO, $SnO_2$, $Ag_2O_2$, AgCl, FeO, $FeO_2$, PbO, PdO, $Al_2O_3$, $Al(OH)_3$, SiO, $SiO_2$, $InO_3$, $InCl_3$, NiO, $NiFe_2O_4$, $NiMoO_4$, $Ni(OH)_2$, CuO, $Cu_2O$, $CuFe_2O_4$, CuCl, CoO, $Co_3O_4$, ZnO, $ZnAl_2O_4$, CdO, or $CdSnO_3$. Preferably, the metal compound includes one or both of $SnO_2$ or SnO.

The metal compound is preferably prepared by heat-treating a fatty acid metal salt.

The fatty acid metal salt is preferably a water-soluble fatty acid metal salt such as metal formate, metal acetate or metal propionate. More preferred are metal acetates because they are thermally stable and have good water-solubility, and most preferred is tin acetate $((CH_3COO)_2Sn)$.

Using the negative active material, an electrode for the rechargeable lithium battery of the present invention is produced.

The electrode is suitably produced by forming a negative active material slurry in a predetermined shape or coating the negative active material slurry on a current collector such as copper. The negative active material slurry includes the negative active material, a conductive agent such as graphite, and a binder.

A rechargeable lithium battery of the present invention includes the aforementioned negative active material.

A rechargeable lithium battery includes a positive electrode, an electrolyte, a separator and the negative electrode using the negative active material, and it comes in various configurations, including cylindrical, prismatic, coin or sheet types.

The positive electrode includes a positive active material, a conductive agent such as carbonaceous material, and a binder. The positive active material may be a compound into or from which lithium is intercalated or deintercalated such as $LiMn_2O_4$, $LiCoO_2$, $LiNiO_2$, $LiFe_2$, $V_2O_5$, TiS, or MoS.

As the separator, an olefinic porous film such as polyethylene or polypropylene may be used.

The electrolyte is produced by dissolving one or more than two lithium salts in one solvent or a mixed solvent of more than two nonprotic solvents. The nonprotic solvents are selected from propylene carbonate, ethylene carbonate, butylene carbonate, benzonitrile, acetonitrile, tetrahydrofuran, 2-methyl tetrahydrofuran, γ-butyrolactone, dioxolane, 4-methyldioxolane, N,N-dimethylformamide, dimethylacetoamide, dimethylsulfoxide, dioxane, 1,2-dimethoxyethane, sulforane, dichloroethan, chlorobenzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol, dimethyl ether. The lithium salts are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein, x and y are natural numbers), LiCl or LiI.

A method for preparing a negative electrode of the present invention is that while fatty acid metal salts are added to the carbonaceous material, they are agglomerated to generate an agglomerated precursor. The agglomerated precursor is heat-treated to convert the fatty acid metal salts into an amorphous metal compound, resulting in a negative active material with agglomerated particles of the carbonaceous material and fatty acid metal salts.

Preferably, the fatty acid metal salt used is in the form of an aqueous solution. In addition, it is desirable that during the agglomerating step, a binder may be used.

The carbonaceous material has an average diameter of 3 to 20 μm and the particle-agglomerated product has an average diameter of 6 to 40 μm.

The fatty acid metal salt includes one or more than two metals which are able to make an alloy with lithium, and they are selected from Sn, Ag, Fe, Pd, Pb, Al, Si, In, Ni, Cu, Co, Zn, or Cd.

The fatty acid metal salt is preferably a water-soluble fatty acid metal salt such as metal formate, metal acetate, and metal propionate, and metal acetate is more preferable because it has good thermally stability and water-solubility.

The exemplary of the fatty acid metal salt preferably has a formula of $(C_nH_{2n+1}COO)_mM$ (where n is 0 to 2, m is 1 to 4, and M is one or more than two metals selected from Sn, Ag, Fe, Pd, Pb, Al, Si, In, Ni, Cu, Co, Zn or Cd), and the most preferred fatty acid metal salt is tin acetate $((CH_3COO)_2Sn)$. The metal compound includes at least one or both compounds selected from $SnO_2$ or SnO.

When tin acetate is used as the fatty acid metal salt, the heat-treating is preferably performed at 250 to 800° C. The heat-treating step is preferably performed under an inert atmosphere or vacuum.

The rechargeable lithium battery of the embodiment of the present invention will be illustrated in reference to the accompanying drawing, but it is not limited into the accompanying drawing.

Figure 1:
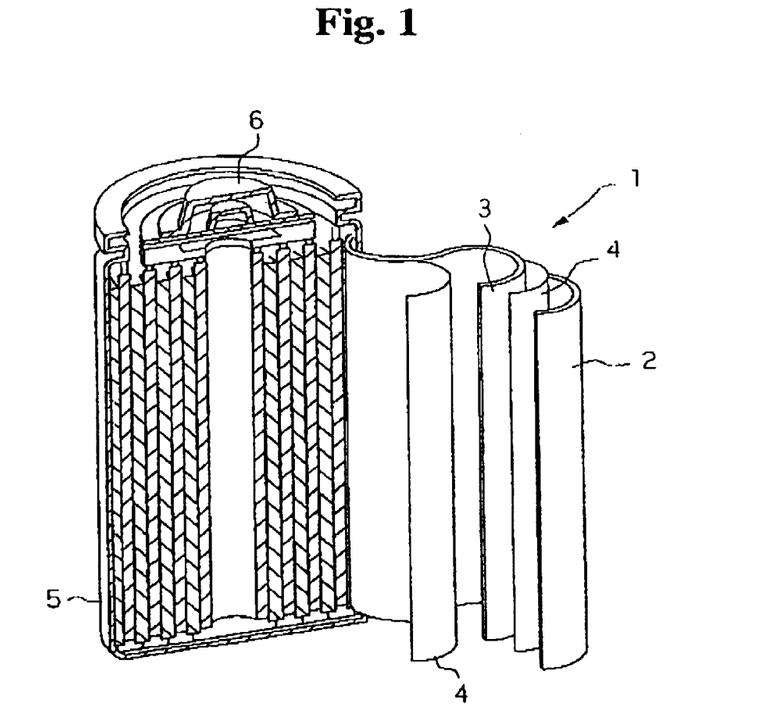
FIG. 1 is a perspective view showing a rechargeable lithium battery of the one embodiment of the present invention.

FIG. 1 shows a rechargeable lithium battery 1 of the present invention. The rechargeable lithium battery 1 is a cylindrical type battery with a negative electrode 2 of the present invention, a sheet type positive electrode 3, a separator 4 interposed between the negative electrode 2 and the positive electrode 3, electrolyte into which the negative electrode 2, the positive electrode 3 and the separator 4 are mostly immersed, a cylindrical battery case 5 and a sealing member 6 for sealing the battery case 5.

The rechargeable lithium battery 1 is manufactured by spirally winding the negative electrode 2, the positive electrode 3 and the separator 4 to produce an electrode element, and inserting the electrode element into the battery case 5.

The negative electrode of the present invention 2 is formed by coating negative electrode slurry including the negative active material on a current collector, such as copper. The negative electrode slurry includes the negative active material, a conductive agent such as graphite, and a binder which bonds the negative active material and the conductive agent, for example polyvinylidene fluoride.

The negative active material of the present invention includes a particle-agglomerated product. The particle-agglomerated product includes a carbonaceous material into or from which lithium is easily intercalated or deintercalated, and an amorphous metal compound which is able to make an alloy with lithium. The metal compound is partially or totally coated on the surface of the particle-agglomerated product. Furthermore, the metal compound is included in the particle-agglomerated product.

The negative active material is desirably a material into or from which lithium ions are reversibly intercalated or deintercalated. For example, it is desirable to use one or more than two materials selected from natural graphite powder, artificial graphite powder, or amorphous carbon.

The average diameter of the particle-agglomerated product is preferably 6 to 40 μm and more preferably 8 to 25 μm, and the shape of the particle-agglomerated product is a bulk form, but preferably a substantially spherical shape.

The negative active material of the present invention can be uniformly and densely coated on a collector without the decreases in the wettability to the electrolyte. In addition, the negative active material can increase the charge and discharge capacity and readily produced the charge and discharge reaction of the rechargeable lithium battery.

The metal compound is one or more than two metals which are able to make an alloy with lithium and it is one or more than two metals selected from Sn, Ag, Fe, Pd, Pb, Al, Si, In, Ni, Cu, Co, Zn, or Cd. Preferred are tin compounds and more preferred are one or both of $SnO_2$ and $SnO$. $SnO_2$ and/or $SnO$ include tin (Sn), which easily makes an alloy with lithium, and thus they exhibit a higher charge and discharge capacity than the carbonaceous material.

Although the tin compound results in a high capacity exhibited negative active material, it is more preferred that the tin compound be used together with carbonaceous materials. When the tin compound and the carbonaceous material are both used, negative active materials exhibiting the advantages of the tin compound as well as the carbonaceous material can be obtained.

In other words, a high charge and discharge capacity is exhibited by the tin compound and high charge and discharge efficiency, good cycle characteristics and discharge curve flatness are exhibited by the carbonaceous material.

The tin compound (metal compound) is prepared by heat-treating fatty acid metal salts, preferably a water-soluble fatty acid such as metal formate, metal acetate, metal propionate, and more preferably tin acetate (($CH_3COO)_2Sn$).

During the heat-treating step, the fatty acid metal salt is converted into an amorphous metal compound.

When $SnO_2$ and/or $SnO$ (tin compound) is used as the metal compound, the amount of the metal compound in the negative active material is preferably 30 wt % or less and more preferably 5 to 20 wt %. When the amount of the metal compound (tin compound $SnO_2$ and/or $SnO$) exceeds 30 wt %, the charge and discharge efficiency and cycle characteristics of the negative active material are deteriorated.

The positive electrode 3 is produced by coating a positive active material slurry including a positive active material on a collector such as aluminum foil. The positive active material slurry includes the positive active material, a conductive agent such as graphite and a binder which bonds the positive active material and the conductive agent, for example polyvinylidene fluoride. The positive active material may be a compound into or from which lithium is intercalated or deintercalate, such as $LiMn_2O_4$, $LiCoO_2$, $LiNiO_2$, $LiFeO_2$, $V_2O_5$, TiS or MoS.

As the separator 4, olefinic porous film such as polyethylene or polypropylene may be used.

The electrolyte may be a material produced by dissolving one or more than two lithium salts in one or more than two nonprotic solvents. The nonprotic solvents are selected from propylene carbonate, ethylene carbonate, butylenes carbonate, benzonitrile, acetonitrile, tetrahydrofuran, 2-methyltetrahydrofuran, v-butyrolactone, dioxolane, 4-methyldioxolane, N,N-dimethylformamide, dimethylacetoamide, dimethylsulfoxide, dioxane, 1,2-dimethoxyethane, sulforane, dichloroethane, chlorobenzene, nitrobenzene, dimethylcarbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol, or dimethyl ether. The lithium salt is selected from $LiPF_6$, $LiBF_4$, $LiSbF_6$, $LiAsF_6$, $LiCl_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein, x and y are natural numbers), LiC or, LiI.

The electrolyte is a solution type, but a polymer solid electrolyte may be used. If a polymer solid electrolyte is used, it is preferred to use a polymer having a high ionic-conductivity to lithium ions. The exemplary of these polymers are polyethylene oxide, polypropylene oxide and polyethylene imine. Also, a gel-type electrolyte produced by adding solute to the polymer may be used.

A method of preparing a negative active material will be illustrated in more detail hereinafter.

While fatty acid metal salt is added to a carbonaceous material, they are agglomerated to produce an agglomerated precursor. The agglomerated precursor is heat-treated, thereby converting the fatty acid metal salt into an amorphous metal compound. As a result, a particle-agglomerated product is obtained.

An aqueous solution of the fatty acid metal salt is preferably used to enable the fatty acid metal salt to be uniformly added to the carbonaceous material.

The fatty acid metal salt includes one or more than two metals which are able to make an alloy with lithium and they are selected from Sn, Ag, Fe. Pd, Pb, Al, Si, In, Ni, Cu, Co, Zn, or Cd. Preferred are water-soluble fatty acid metal salts such as metal formate, metal acetate, or metal propionate, and more preferred are metal acetates because they have good thermal stability and good water-solubility.

The preferable example of the fatty acid metal salt has the formula $(C_nH2_{n+1}COO)_mM$, wherein n is 0 to 2, m is 1 to 4, and M is one or more than two elements selected from Sn, Ag, Fe, Pd, Pb, Al, Si, In, Ni, Cu, Co, Zn, or Cd.

Tin acetate is most preferred.

As the carbonaceous material, it is desirable to use any material into or from which lithium ions can be intercalated or deintercalated. For example, it is desirable to use one or two carbonaceous materials selected from natural graphite powder, artificial graphite powder, or amorphous carbon. The carbonaceous material preferably has an average diameter of 3 to 20 μm.

A mechanochemical agglomeration method is used to agglomerate the mixture while the aqueous solution of fatty acid metal salt is being added to the carbonaceous material, and the exemplary of the mechanochemical process is a mechano-fusion method whereby shear force is applied to the mixture to adhere the fatty acid metal salt to the surface of the carbonaceous material.

Another way to agglomerate the mixture is to spray the aqueous solution of fatty acid metal salt onto the carbonaceous material and then evaporate the water, thereby depositing the fatty add metal salt on the surface of the carbonaceous material.

If tin acetate is used as the fatty acid metal salt, the amount (addition amount) of tin acetate is preferably 50 wt % or less, and more preferably 10 to 40 wt %. More than 50 wt % tin acetate is too much because it decreases the charge and discharge efficiency and cycle characteristics of the negative active material.

The particle-agglomerated product has preferably an average diameter of 6 to 40 μm, and more preferably 8 to 25 μm. Furthermore, the particle-agglomerate product preferably has a substantially spherical shape. If the average diameter is less than 6 μm, the negative active material is not densely enough packed to the collector and is easily separated from the collector during charge and discharge. But, if the average diameter is more than 40 μm, it is difficult to produce the spherical-type particle-agglomerated product, and the adherence between the negative active material and the binder decreases.

Thereafter, the agglomerated precursor is heat-treated. The heat-treatment results in the pyrolysis of the fatty acid metal salt to convert the fatty acid metal salt into a metal compound. For example, when tin acetate is used as the fatty acid metal salt, a tin compound including amorphous $SnO_2$ and SnO as the metal compound is produced.

If tin acetate is used as the fatty acid metal salt, the temperature of the heat-treating is preferably 250 to 800° C., and more preferably 300 to 500° C. If the temperature of the heat-treating is less than 250° C., the pyrolysis of the tin acetate is not complete so that it is impossible to produce the tin compound. But it the temperature of the heat-treating is more than 800° C., the resulting product includes no amorphous $SnO_2$ and SnO. The temperature of the heat-treating may depend on the type of the fatty acid metal salt. The heat-treatment is preferably performed under an inert atmosphere or vacuum.

As a result of the above processes, a particle-agglomerated product including the carbonaceous material and amorphous $SnO_2$ and SnO as the metal compound is obtained.

The negative active material for a rechargeable lithium battery of the present invention, including the product obtained by the above processes, has advantages of both the tin compound and the carbonaceous material. In other words, the negative active material exhibits a high charge and discharge capacity owing to the tin compound, and high charge and discharge efficiency, good cycle characteristics and discharge curve flatness owing to the carbonaceous material.

Because the negative active material is a particle-agglomerated product, it can be densely coated on the collector without the decreases in the wettability to the electrolyte, and the charge and discharge reaction can be readily produced. The particle-agglomerated product preferably has a substantially spherical shape because the negative active material can thereby be more densely coated on the collector.

In the method of preparing a negative active material of the present invention, a water-soluble fatty acid metal salt is used and the step of adding the fatty acid metal salt to the carbonaceous material and the step of agglomerating are simultaneously performed. Accordingly, the fatty acid metal salt is included in the particle-agglomerated product so that a negative active material having a uniform composition can be produced.

The following examples further illustrate the present invention.

EXAMPLE 1

6 g of tin acetate was dissolved in 5 ml of pure water to produce an aqueous solution of tin acetate. The aqueous solution of tin acetate was added to 30 g of natural graphite with an average diameter of 8 μm and they were mixed well. The mixture was input to a powder coating and agglomerating device.

The powder coating and agglomerating device includes a cylindrical mixing bath with a bottom and an inner piece which is designed to readily rotate in the cylindrical mixing bath and moves at a narrow distance from the inside wall of the cylindrical mixing bath. In the powder coating and agglomerating device, the mixture was rotated in the mixing bath by the rotation of the inner piece to apply the strong shear force to the mixture, thereby agglomerating the mixture. After the mixture was input to the powder coating and agglomerating device, the inner piece was rotated at a rate of 2500 rpm for 30 minutes to produce an agglomerated precursor.

Thereafter, the agglomerated precursor was heat-treated at 350° C. for 10 hours under a nitrogen atmosphere to pyrolyze tin acetate. As a result, a negative active material was prepared.

EXAMPLE 2

50 g of tin acetate was dissolved in 300 g of pure water to prepare an aqueous solution of tin acetate. Thereafter, 250 g of natural graphite with an average diameter of 15 μm was input into an agglomerating bath with a rotating wing of a fluid device for agglomerating particles in air-jet.

Thereafter, while the aqueous solution of tin acetate was added to the natural graphite in the agglomerating bath, the wing was rotated at a rate of 500 rpm for 30 minutes to agglomerate the natural graphite. As a result, an agglomerated precursor was obtained.

Thereafter, the agglomerated precursor was heat-treated at 400° C. for 10 hours under vacuum to pyrolyze tin acetate. As a result, a negative active material was prepared.

EXAMPLE 3

45 g of tin acetate was dissolved in 30 g of pure water to prepare an aqueous solution of tin acetate. 150 g of natural graphite with an average diameter of 8 μm was input into an agglomerating bath with a rotating wing of a fluid device for agglomerating particles. While the rotating wing was rotated at a rate of 700 rpm, the aqueous solution of tin acetate was slowly added to the agglomerating bath.

After the completion of the addition of tin acetate, the rotating wing was rotated at a rate of 2200 rpm for 5 minutes to agglomerate the mixture. The resulting mixture was dried at 80° C. for 20 minutes to become an agglomerated precursor.

The agglomerated precursor was heat-treated at 350° C. for 4 hours under vacuum to pyrolyze tin acetate. As a result, a negative active material was prepared.

COMPARATIVE EXAMPLE 1

Natural graphite with an average diameter of 18 μm was used for a negative active material.

Manufacturing of Test Cell for Charge and Discharge Test

Each of the negative active materials of Examples 1 to 3 and Comparative example 1 was mixed with polyvinylidene fluoride and the mixture was mixed with N-methylpyrrolidone to produce a slurry.

The slurry was coated on a copper foil with a thickness of 18 μm using the doctor-blade method. The coated foil was dried at 100° C. for 24 hours under vacuum to evaporate N-methylpyrrolidone, and the thickness of the resulting material on the foil was 120 μm. The amount of polyvinylidene fluoride was 10 wt % in the negative active material slurry.

The copper foil coated with the negative active material slurry was punched into a round shape to make a negative electrode, and lithium metal foil was cut into a round shape to use as a reference electrode.

A porous polypropylene film separator was inserted between the negative electrode and the reference electrode to produce a coin-type half cell. As the electrolyte, 1M $LiPF_6$ in a mixed solvent of propylene carbonate, diethyl carbonate and ethylene carbonate (1:1:1 volume ratio) was used.

The coin-cell was charged to a cut-off voltage of 0V ($Li/Li^+$) and discharged to a cut-off voltage of 2.0V ($Li/Li^+$). At this time, the charge and discharge current density was set to 0.2 C.

Figure 2:
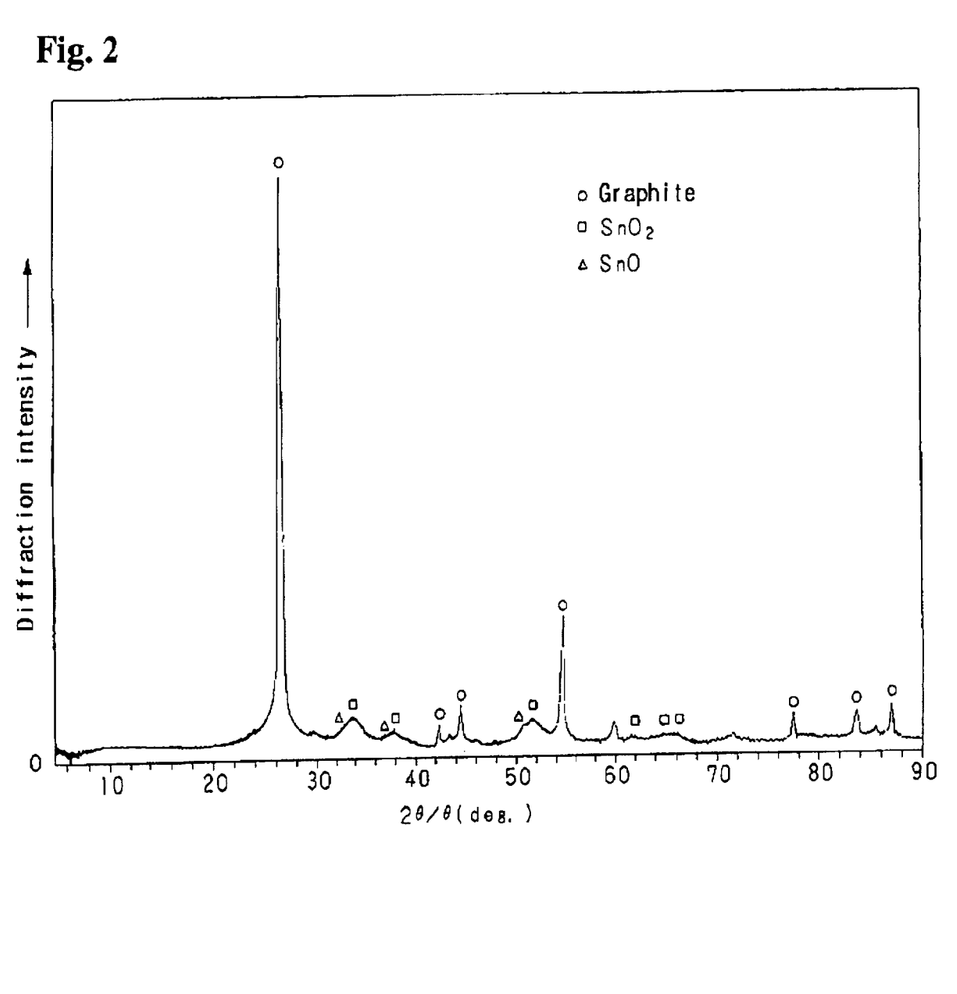
FIG. 2 is a graph showing an X-ray diffraction analysis result of the negative active material of Example 1.
Figure 3:
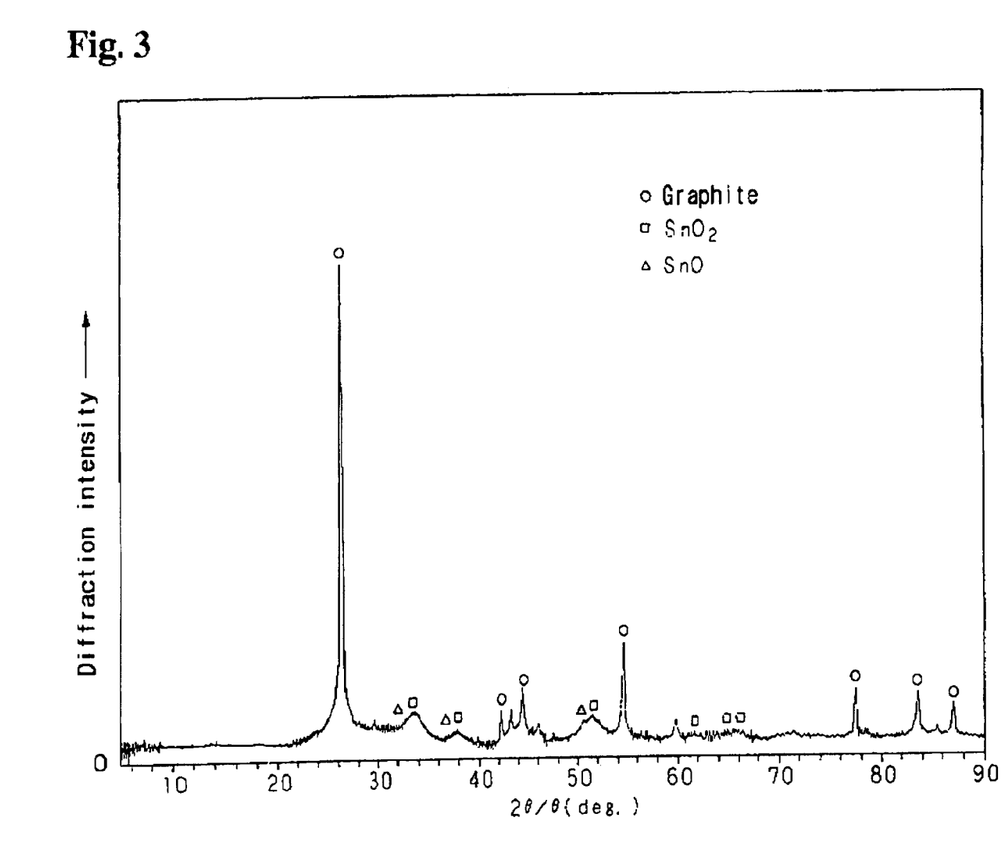
FIG. 3 is a graph showing an X-ray diffraction analysis result of the negative active material of Example 2.

FIG. 2 shows a result of X-ray diffraction analysis of the negative active material of Example 1, and FIG. 3 shows a result of X-ray diffraction analysis of the negative active material of Example 2.

Figure 4:
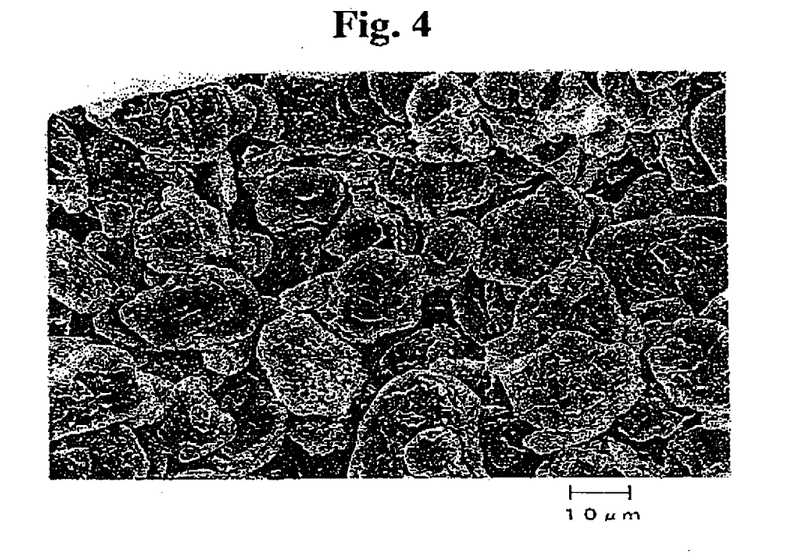
FIG. 4 is an electromicroscope photograph of the negative active material of Example 3.
Figure 5:
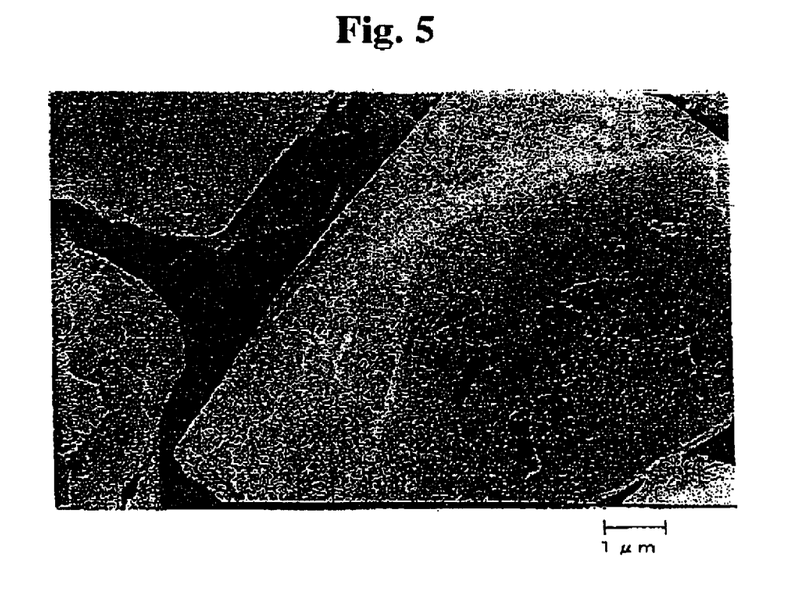
FIG. 5 is an enlarged photograph of FIG. 4.

FIG. 4 shows an electromicroscope photograph of the negative active material of Example 3, and FIG. 5 shows an enlarged photograph of FIG. 4.

Figure 6:
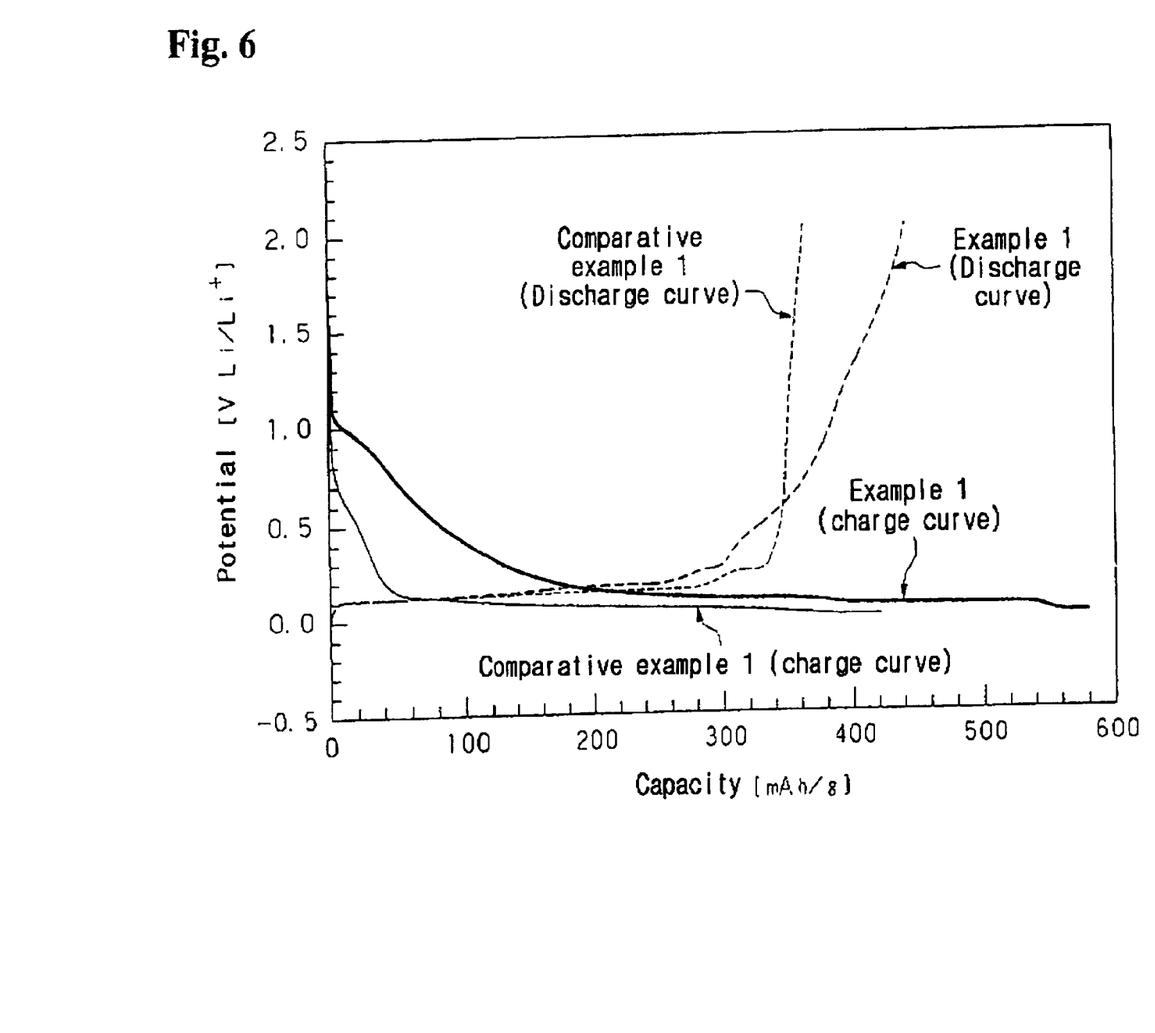
FIG. 6 is a graph showing charge and discharge results at a first cycle of the test cell used with Example 1 and Comparative example 1, respectively.
Figure 7:
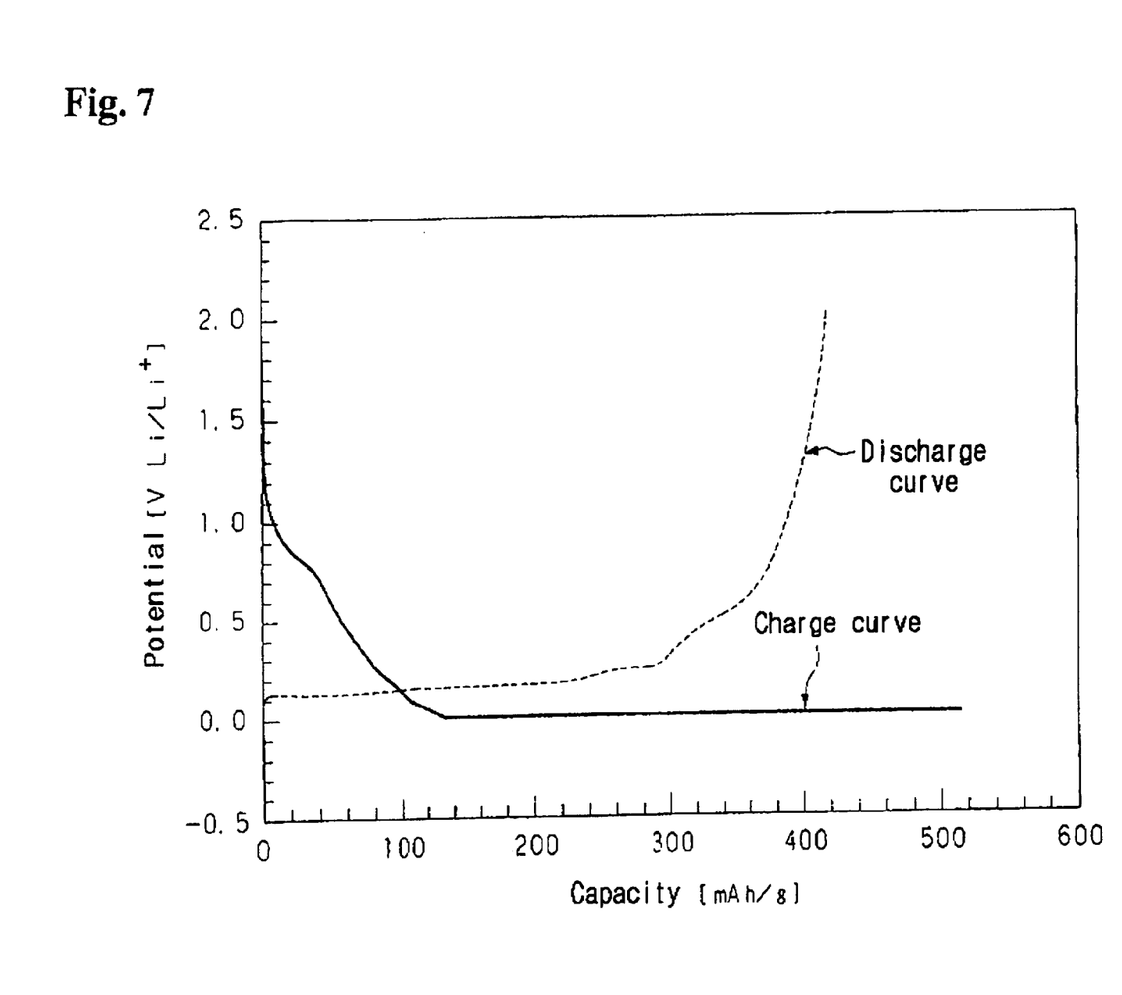
FIG. 7 is a graph showing charge and discharge results at a first cycle of the test cell used with Example 2, respectively.
Figure 8:
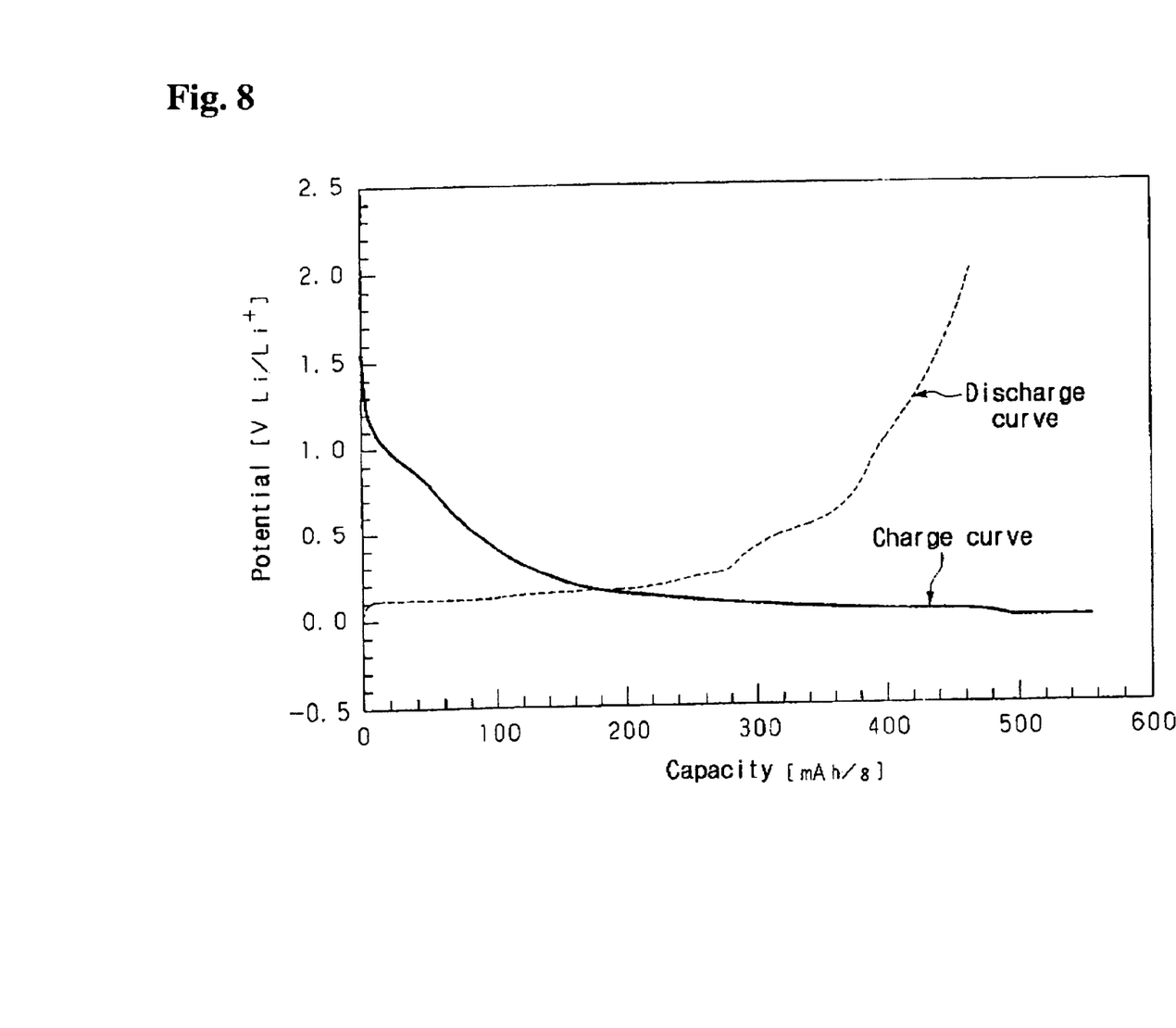
FIG. 8 is a graph showing charge and discharge results at a first cycle of the test cell used with Comparative example 3, respectively.

FIG. 6 illustrates the charge and discharge characteristics at a first cycle of the test cells used the negative active materials according to Example 1 and Comparative example 1, respectively. FIG. 7 illustrates the charge and discharge characteristics at a first cycle of the test cell using the negative active material of Example 2 and FIG. 8 illustrates the charge and discharge characteristics at a first cycle of the test cell using the negative active material of Example 3.

Table 1 shows volume density, tapping density, charge capacity and discharge capacity at a first cycle of each of the negative active materials according to Examples 1 to 3 and Comparative example 1.

As shown in FIGS. 2 and 3, the negative active materials of Examples 1 and 2 show diffraction peaks of graphite as well as $SnO_2$ and SnO. The diffraction peaks by $SnO_2$ and SnO are broad, and appear amorphous.

Furthermore, the element analysis of the negative active materials according to Examples 1 to 3 was performed by energy distribution X-ray diffraction and the results indicated that all negative active materials give the energy peaks of Sn.

These results indicate that the negative active materials of Examples 1 to 3 included amorphous $SnO_2$ and SnO.

As shown in Table 1, the negative active materials of Examples 1 to 3 have larger volume and tapping densities than those of Comparative example 1. In particular, the tapping density of negative active materials according to Examples 1 to 3 was twice that of Comparative example 1. Furthermore, as shown in FIGS. 4 and 5, the negative active material according to Example 3 was a product of agglomerating particles of flake type graphite powder. In FIGS. 4 and 5, the imbricate scale appearing on the surface of bulk particle-agglomerated product is one particle of graphite.

It is considered that the larger volume density and tapping density of the negative active material according to Examples 1 to 3 than those of Comparative example 1 is caused by the bulk agglomerated product of graphite powder.

Furthermore, as shown in Table 1, the charge capacity and discharge capacity of the negative active materials according to Examples 1 to 3 were higher than that of Comparative example 1. In particularly, the discharge capacity of the negative active material according to Example 3 was 468 mAh/g, which is larger than that of Comparative example 1 by about 100 mAh/g, and is very high.

TABLE 1

| | Volume density (g/cm³) | Tapping density (g/cm³) | Charge capacity (mA/h) | Discharge capacity (mA/g) |
|---|---|---|---|---|
| Example 1 | 0.528 | 0.960 | 583 | 447 |
| Example 2 | 0.328 | 0.620 | 519 | 423 |
| Example 3 | 0.626 | 1.024 | 560 | 466 |
| Comparative Example 1 | 0.245 | 0.570 | 426 | 365 |

When compared to FIGS. 6 to 8, the discharge curve of the negative active material according to Comparative example 1 (FIG. 6) shows an extreme voltage drop at the end of discharge. Whereas, that of Examples 1 to 3 shows a smooth voltage drop at the end of discharge.

It was generally known that the voltage drop in the deintercalation of lithium intercalated into $SnO_2$ and SnO appears smooth. Accordingly, the smooth voltage drop in the end of discharge of the negative active materials according to Examples 1 to 3 is caused by the liberation of lithium intercalated into $SnO_2$ and SnO.

As described above, the negative active materials according to Examples 1 to 3 have smooth voltage drops at the end of discharge. With the smooth voltage drop, it is possible to easily detect the remaining charge capacity by measuring voltage change regularly. Accordingly, the present invention has unique characteristics which make it possible to determine the remaining charge capacity of a rechargeable lithium battery using the graphite. Conventionally, it is impossible to determine the remaining charge capacity of a rechargeable lithium battery because of the abrupt voltage drop that occurs.

The sprit of the present invention is not limited to the above description, and various changes and modifications within the sprit of the present invention can be made. For example, the embodiment is a cylindrical rechargeable lithium battery, but the present invention may be employed in prismatic, coin or sheet type batteries.

As described above, since the negative active material for a rechargeable lithium battery of the present invention includes the particle-agglomerated product of the carbonaceous material and amorphous metal compound, the negative active material has advantages of the tin compound as well as the carbonaceous material. In other words, the negative active material exhibits a high charge and discharge capacity owing to the tin compound, and a high charge and discharge efficiency, good cycle characteristics and discharge curve flatness owing to the carbonaceous material.

Because the negative active material is a particle-agglomerated product, the negative active material can be densely coated on the collector without the decreases in the wettability to the electrolyte, and the charge and discharge reaction can be readily produced. The particle-agglomerated product preferably has a substantially spherical shape because the negative active material can be more densely coated on the collector.

The metal compound on the surface of and in the particle-agglomerated product increases the charge and discharge capacity of the negative active material.

In addition, the average diameter of the particle-agglomerated product is set to 6 to 40 μm, thereby increasing tapping density of the negative active material.

The metal compound includes one or two metals selected from Sn, Ag, Fe, Pd, Pb, Al, Si, In, Ni, Cu, Co, Zn, or Cd so that the charge and discharge capacity of the negative active material increases.

When the metal compound includes $SnO_2$ and/or SnO, which exhibits very high charge and discharge capacity, the negative active material has a larger charge and discharge capacity.

The rechargeable lithium battery of the present invention includes the above negative active material so that the deintercalation of lithium intercalated into $SnO_2$ and/or SnO mainly occurs at the end of discharge and the voltage drop smoothly occur at the end of discharge. With a smooth voltage drop, it is possible to easily detect the remaining charge capacity by determining voltage level regularly. Accordingly, the present invention has unique characteristics which make it possible to determine the remaining charge capacity of the rechargeable lithium battery using graphite. Conventionally, it is impossible to determine the remaining charge capacity of a rechargeable lithium battery.

In the method of preparing a negative active material of the present invention, aqueous fatty acid metal salt is used and the step of adding fatty acid metal salt to the carbonaceous material and the agglomerating step simultaneously proceed. Accordingly, the fatty acid metal salt is included in the agglomerated product so that a negative active material having uniform composition can be produced.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing a negative active material for a rechargeable lithium battery comprising the steps of:

adding a fatty acid metal salt to a carbonaceous material while the fatty acid metal salt and the carbonaceous material are agglomerated to produce an agglomerated precursor, wherein the fatty acid metal salt includes one or more metals selected from the group consisting of Sn, Ag, Fe, Pd, Pb, Al, Si, In, Ni, Co, Zn and Cd; and heat-treating the agglomerated precursor to convert the fatty acid metal salt into an amorphous metal compound and to produce a particle agglomerated product.

2. The method of claim 1 wherein the fatty acid metal salt is used in the form of an aqueous solution.

3. The method of claim 1 wherein the carbonaceous material has an average diameter of 3 to 20 $\mu$m and the particle-agglomerated product has an average diameter of 6 to 40 $\mu$m.

4. The method of claim 1 wherein the fatty acid metal salt is tin acetate.

5. The method of claim 1 wherein the metal compound includes one or both of $SnO_2$ or SnO.

6. The method of claim 1 wherein the heat-treating is performed at 250 to 800° C.

7. The method of claim 1 wherein the amorphous metal compound is included in an amount of 30 wt % or less based on the total weight of the negative active material.

8. The method of claim 1 wherein the amorphous metal compound is included in an amount ranging from 5 to 20 wt % based on the total weight of the negative active material.

* * * * *